United States Patent Office 3,183,109
Patented May 11, 1965

3,183,109
THIXOTROPIC COMPOSITIONS
Wolfram Neumann and Erich Zankl, Leverkusen, Germany, assignors to Farbenfabriken Bayer Aktiengesellschaft, Leverkusen, Germany, a corporation of Germany
No Drawing. Filed Mar. 14, 1960, Ser. No. 15,001
Claims priority, application Germany, Mar. 14, 1959,
F 27,958
3 Claims. (Cl. 106—252)

This invention relates to thixotropic compositions. More particularly, this invention relates to improved thixotropic coating compositions and precursors thereof which are suitable for use in conjunction with heretofore known lacquer components, for example, to impart thixotropic properties to lacquers and the like.

No satisfactory explanation for the phenomenon of thixotropy has been proposed. It is known that some compositions becomes less viscous when subjected to high shear rates and then return to their normal condition when they are allowed to stand. It is desirable to be able to impart this property to coating compositions and the like so that when they are brushed or sprayed onto a substrate, they will tend to flow out evenly and in a mobile condition but return at once to their standing viscosity as soon as the shear rate decreases.

It is an object of this invention to provide an improved product for imparting thixotropic properties to coating compositions. Another object of the invention is to provide improved thixotropic coating compositions. A further object of this invention is to provide an improved additive for imparting thixotropic properties to lacquer compositions. Still another object of this invention is to provide an improved process for the preparation of additives which are adapted to impart thixotropic properties to coating compositions and the like. Another object of this invention is to provide an improved method of imparting thixotropic properties to coating compositions.

The foregoing objects and others are accomplished in accordance with this invention, generally speaking, by providing a product having thixotropic properties prepared by reacting a carboxylic acid with an organic monoisocyanate or a symmetrical organic polyisocyanate, said carboxylic acid or one of said isocyanates containing a chain of at least ten carbon atoms, in a first step and then combining the product of said first step in a second step with at least one of the components of a coating composition. The invention, therefore, provides thixotropic additives which are prepared from carboxylic acids which may be either monocarboxylic acids or polycarboxylic acids and organic monoisocyanates or symmetrical organic polyisocyanates. The reaction product of this first step is then combined with a drying or non-drying oil, a natural or synthetic resin, a solvent or other component of a coating composition to produce a product having thixotropic properties in a second step. It is an essential feature of the invention that the reaction products be prepared from at least one carboxylic acid or at least one isocyanate which has a carbon chain of at least ten carbon atoms. Moreover, from about 0.1 percent to about 30 percent by weight of the reaction product of the carboxylic acid and the organic isocyanate should be combined with at least one component of the coating composition. In other words, if the carboxylic acid-organic isocyanate reaction product is combined with the drying oil component, solvent, or synthetic resin component of a coating composition, from about 0.1 percent to about 30 percent of the respective component should be the carboxylic acid-organic isocyanate reaction product.

The term, "symmetrical organic polyisocyanate," as used throughout this specification and in the claims, is intended in the usual chemical sense to mean those organic polyisocyanates which exhibit symmetry in their structural formula. In other words, the organic polyisocyanates may have the isocyanate radicals located at two or more terminal points in the chain or at equidistant points on an aromatic nucleus. Moreover, the isocyanate radicals may be located at each end of a molecule, even though the balance of the molecule is unsymmetrical. The symmetry in this later type of molecule is with regard to the isocyanate radicals and not with regard to any other branch chains or cyclic configurations which may be interposed between the respective isocyanate groups. For example, alpha, omega-isocyanato straight chain hydrocarbons may be the symmetrical organic polyisocyanates such as, for example, ethylene diisocyanate, 1,6-hexamethylene diisocyanate, 1,8-octamethylene diisocyanate and the like. Symmetrical aromatic polyisocyanates may also be used such as, for example, 2,6-toluylene diisocyanate, 1,3,5-benzene triisocyanate, diphenyl dimethyl methane 4,4'-diisocyanate, 1,5-dimethyl (2,4-omega diisocyanato methyl) benzene, 1,5-dimethyl (2,4-omega diisocyanato ethyl) benzene, 1,3,5-trimethyl (2,4-omega diisocyanato methyl) benzene, 1,3,5-triisopropyl benzene-2,4-diisocyanate, and the like. One may also use organic symmertical polyisocyanates which contain hetero atoms in the chain such as, for example, omega,omega-dipropyl ether diisocyanate, thiodipropyl diisocyanate and the like. Of course, the symmetrical cycloaliphatic polyisocyanates may also be used such as, for example, cyclohexyl 1,4-diisocyanate, dicyclohexyl methane-4,4'-diisocyanate and the like. In addition, one may use symmetrical organic polyisocyanates which contain unsymmetrical structures in the molecule but are nevertheless symmetrical with regard to the location of the isocyanate groups such as, for example, 4-omega alkyl isocyanato phenyl isocyanates, such as, for example, 4-omega-propyl isocyanato phenyl isocyanate, 4-omega-methyl isocyanato phenyl isocyanate and the like or 4(gamma isocyanato propoxy) phenyl isocyanate. The symmetrical organic polyisocyanates may be used in admixture with an unsymmetrical organic polyisocyanate such as, for example, 2,4-toluylene diisocyanate. If mixtures of symmetrical and unsymmetrical organic polyisocyanates are used, at least 30 percent by weight of the organic polyisocyanate should be a symmetrical organic polyisocyanate and it is preferred that at least about 50 percent of the organic polyisocyanate be either a symmetrical polyisocyanate or an organic monoisocyanate. Also, one may use blocked isocyanates, such as, for example, the reaction product of 2,6-toluylene diisocyanate with a phenol, such as cresol and the like.

Suitable organic monoisocyanates are, for example, cyclohexyl isocyanate, phenyl isocyanate, 3-carbomethoxy phenyl isocyanate, 3,5-carbomethoxy phenyl isocyanate, hexyl isocyanate, dodecyl isocyanate, octadecyl isocyanate, benzyl isocyanate, stearyl isocyanate and the like.

The carboxylic acids which are used in the first step for reaction with the organic monoisocyanate or symmetrical organic polyisocyanate may be any suitable monocarboxylic or polycarboxylic acid such as, for example, stearic acid, palmitic acid, oleic acid, sorbic acid, fatty acids of linseed oil, ricinene oil, soybean oil and coconut oil, hydrocarbon polycarboxylic acids, such as methyladipic acid, ethyl-adipic acid, azelaic acid, sebacic acid, isosebacic acid, dimerized and trimerized unsaturated fatty acids, such as, for example, dimerized and trimerized fatty acid of linseed oil. It is also possible to use those carboxylic acids which contain other groups capable of reacting with isocyanate, such as, for example, ricinoleic acid.

Polyesters or polyester amides with free carboxyl groups may be used as polycarboxylic acids. Such polyesters or polyester amides preferably have a molecular weight between about 500 and about 2000 and may be obtained, for example, from the reaction of polyhydric alcohols with an excess of a polycarboxylic acid, if desired in the presence of polyhydric amines, aminoalcohols or aminocarboxylic acids. Any suitable polyhydric alcohol may be used, such as, for example, ethylene glycol, propylene glycols, butylene glycols, hexanediols, 2,2-dimethyl-1,3-propanediol, diethylene glycol, polyethylene glycols, butenediol, quinitol, 4,4'-dihydroxydicyclohexyl dimethyl methane, alkine diols, thiodiglycol, diethanolamine, triethanolamine, glycerine, trimethylol propane, trimethylol ethane, hexanetriol, castor oil, pentaerythritol as well as reaction products of the above alcohols with alkylene oxides, such as ethylene oxide, propylene oxide, styrene oxide and the like. Also included are the reaction products of polyhydricphenols with alkylene oxides, such as, for example, bis-hydroxyethylether of 4,4'-dihydroxy-diphenylmethane and the like. Suitable polycarboxylic acids are, for example, oxalic acid, succinic acid, adipic acid, methyladipic acid, sebacic acid, sorbic acid, phthalic acid, isophthalic acid, terephthalic acid, chlorinated phthalic acids, hexachlorendomethylene tetrahydrophthalic acid, 4,4'-diphenyl sulphone dicarboxylic acid, citric acid, benzene-1,2,4-tricarboxylic acid, benzene-1,3,5-tricarboxylic acid, maleic acid, fumaric acid, dimerized and trimerized unsaturated fatty acids, such as, for example, dimerized and trimerized fatty acids of linseed oil and the like. Suitable amino carboxylic acids are, for example, glycine, L-phenylalanine and the like.

As stated above, either the monocarboxylic and/or polycarboxylic acid and/or the organic monoisocyanate and/or symmetrical organic polyisocyanate must contain at least one carbon chain of at least ten carbon atoms. It is not necessary that all of the carboxylic acids and all of the organic isocyanates contain the carbon chain of at least ten carbon atoms, but it is essential that one or the other or both contain a carbon chain of at least ten carbon atoms. Moreover, either the carboxylic acid or the organic isocyanate may be mixed with other components which would be unsuitable, if used alone. For example, a polyester having terminal carboxyl groups and obtained from adipic acid and ethylene glycol which would be unsuitable if used alone for reaction with an isocyanate that contained no chain having at least ten carbon atoms, may be used in conjunction with a carboxylic acid which does have a carbon chain of at least ten carbon atoms such as, for example, stearic acid, oleic acid, fatty acids of linseed oil, fatty acids of cottonseed oil, fatty acids of soybean oil, fatty acids of ricine oil and the like. Also, an organic isocyanate can be used which contains a chain of at least ten carbon atoms in conjunction with an organic isocyanate which does not contain such a carbon chain. Alternately, a symmetrical isocyanate can be used in conjunction with an unsymmetrical isocyanate, neither of which contain a carbon chain of ten carbon atoms for reaction with a mixture of carboxylic acids at least one of which does contain a carbon chain of at least ten carbon atoms.

As stated above, the carboxylic acid-organic isocyanate reaction product may be combined with and is preferably chemically combined with any suitable component of a coating composition to impart thixotropic properties thereto. Any suitable solvent may be used as a component for combination with the carboxylic acid-organic isocyanate reaction product such as, for example, alcohols, ketones, esters, ethers, hydrocarbons and the like. Suitable solvents for combination with the carboxylic acid-organic isocyanate reaction products are, for example, xylene, toluene, white spirit, benzine, ethyl acetate, butyl acetate, amyl acetate, 4-hydroxy-4-methyl-2-pentanone, methyl ethyl ketone, methyl isobutyl ketone, isophorone, 2-(2-methoxy hydroxy)-ethanol, furfuryl alcohol, tetraline, cyclohexanone, decaline, dipentene, turpentine oil, and the like. Butylene glycol, butanol and the like can be admixed.

Any suitable lacquer component may be used for combination with the reaction product of the carboxylic acid and organic isocyanate such as, for example, linseed oil, tung oil, transesterified linseed oil, soybean oil, fish oil, oiticica oil, sunflower oil, perilla, cashew nut oil, olive oil, and the like, as well as nondrying oils such as, for example, castor oil and the like. It is preferred to use drying oils which on evaporation of the solvent will yield a dry, hard film. Either natural or synthetic resin lacquer components may be combined in accordance with the present invention with the carboxylic acid-organic isocyanate reaction product to impart thixotropic properties thereto such as, for example, polyesters obtained from an organic polycarboxylic acid and a polyhydric alcohol and particularly the alkyd resins. These polyesters preferably have a molecular weight above about 1,000 and most preferably within the range of about 2,000 to 10,000. Suitable polycarboxylic acids are, for example, adipic acid, sebacic acid, suberic acid, phthalic acid, 1,3,5-benzene tricarboxylic acid, terephthalic acid and the like. Suitable polyhydric alcohols are, for example, ethylene glycol, 1,4-butylene diol, 1,6-hexane diol, 1,3,6-hexane triol, trimethylol propane, pentaerythritol and the like. Alkyd resins are most preferably prepared by transesterification of the above-mentioned natural oils with polyalcohols like trimethylol propane, glycerol, pentaerythritol, butylene glycol, and then with phthalic acid, isophthalic acid and trimellitic acid. Natural resins may also be used such as, for example, rosin, shellac, copal and the like. A further type of semi-synthetic lacquers useful in the process of the invention are the urethane oils, obtained in known manner by reesterification of fatty oils with polyvalent alcohols and subsequent modification with polyisocyanates.

The degree of thixotropy imparted to the coating composition component is dependent upon the nature of the component and the amount of the carboxylic acid—organic isocyanate reaction product which is combined therewith. As pointed out above, relatively minor amounts of about 0.1 percent by weight will impart thixotropic properties to the lacquer component and it is satisfactory to use up to about 30 percent by weight of the carboxylic acid-organic isocyanate reaction product.

The lacquer components obtained in accordance with present invention have the advantage of being insensitive to butanol. In other words, the solutions can be extensively mixed with butanol without the thixotropic character of the component being lost. The thixotropic lacquer component can then be combined with pigments such as titanium oxide, zinc oxide and the like. Dryers, such as lead, cobalt or manganese and particularly the naphthenates and the like are suitable dryers. The order of addition in the preparation of the coating compositions of the invention is not critical so long as the carboxylic acid and organic isocyanate are reacted first and then combined with the other components of the coating composition. The carboxylic acid-organic isocyanate reaction product of the first step is preferably combined with one of the coating composition components and then mixed with the balance of the components. Moreover, it is most preferred to chemically combine the reaction product of the carboxylic acid and the organic isocyanate with one of the lacquer components, such as, the solvent, for example, and then mix that product with the balance of the components. Where the carboxylic acid-organic isocyanate reaction product is chemically combined with one of the coating composition components, it may be combined through reaction of carboxylic acid groups, isocyanate groups or unsaturated linkages with suitable reactive groups or positions in the coating composition component. Free carboxyl groups or isocyanate will react, for example, with hydroxyl groups, primary and secondary amino groups, activated methylene groups such as in aceto-acetic ester, i.e. enolizable methylene groups, and the like in the solvent, the oil, including plasticizers, pigments, synthetic or natural resins or any other suitable component in the coating composition. Alternately, if the carboxylic acid-organic isocyanate contains some unsaturation, as ethylenic unsaturation, for example, it may be chemically combined with one of the other coating composition components through similar unsaturation therein, such as the solvent, the resin, oil or other solid or potential solid content pigment or the like. The carboxylic acid-organic isocyanate reaction product may be added to the other components after they have been mixed. This is not preferred since control of the nature of the final product is more difficult.

The coating compositions of the invention are preferably lacquers comprising a mixture of an organic solvent, a drying oil or resin and the carboxylic acid-organic isocyanate reaction product. The coating composition may be applied in any suitable manner as by brushing, spraying, rolling and the like. The substrate may be any suitable substrate, as wood, paper, metal, leather, textiles, threads, wire and the like. The coatings have good chemical resistance.

The invention is further illustrated by the following examples in which the parts are by weight unless otherwise indicated.

Example 1

In a stirrer-type vessel, about 280 parts of fatty acid of linseed oil are heated in an inert gas atmosphere to about 120° C. and within about 1 to about 1½ hours, while the temperature is slowly rising to about 250° C., about 87 parts of tolulyene 2,6-diisocyanate are added dropwise, $CO_2$ being evolved. The mixture is stirred for about another 3 hours at about 250° C. After cooling there remains a clear brown soft resin, which is soluble in xylene and has thixotropic properties. If about 50 parts of the reaction product are mixed with about 950 parts of an alkyd resin with a content of about 56% of fatty acids from drying oils and a phthalic acid resin content of about 44% and if the mixture is stirred for about 1 to about 2 hours at about 250° C., there is obtained on cooling a highly thixotropic alkyd resin, the dilute solutions of which still have a pronounced degree of thixotropy in white spirit.

Example 2

About 131 parts of 4,4'-cyclohexylmethane diisocyanate are melted in a stirrer-type vessel in an inert gas atmosphere and at about 120 to about 250° C., about 280 parts fatty acid of linseed oil are added within about 1 to about 1½ hours, $CO_2$ being evolved. The mixture is stirred for about another 12 hours at about 250° C. and, on cooling, there is formed a light brown waxy soft resin which is soluble as approximately 10 and 20% solutions in xylene and imparts remarkable thixotropic properties to these solutions.

About 100 parts of this reaction product are mixed with about 100 parts of linseed oil and stirred for about 4 hours at about 250 to about 300° C. A light-coloured soft resin is formed which is soluble in xylene and is thixotropic.

About 50 parts of a mixture prepared in this way is mixed as in Example 1 with about 950 parts of an alkyd resin which contains about 56% of fatty acids derived from drying oils and a phthalic acid resin content of about 44% and treated as previously described. On cooling, it is diluted with lacquer benzine to a 60% solution. The lacquer mixture is thixotropic.

Example 3

Carboxylic acid-organic polyisocyanate reaction products are prepared from the reactants given in the following table, the order of addition and reaction conditions being as indicated:

| Initially provided compound | Added compound | Addition temperature (degrees C.) | Addition period (hours) | Final heating temperature (degrees C.) | Final heating period (hours) |
|---|---|---|---|---|---|
| 280 parts of fatty acid of linseed oil. | 84 parts of hexamethylene-1,6-diisocyanate. | 120-200 | 1-2 | 200 | 4 |
| 140 parts of fatty acid of linseed oil. | 43 parts of a mixture of toluylene-2,6-diisocyanate +toluylene-2,4-diisocyanate 35:65. | 120-165 | 3 | 200 | 5 |
| Do | 75 parts of diphenyl methane-4,4'-diisocyanate. | 120-160 | 2 | 215-260 | 5 |
| Do | 54 parts of 1,5-dimethyl-2,4-isocyanatomethyl benzene. | 120-260 | 1 | 250 | 5 |
| 41 parts of cyclohexyl-1,4-diisocyanate. | 140 parts of fatty acid of linseed oil. | 250-260 | 2½ | 250-270 | 5 |
| 131 parts of cyclohexyl methane-4,4'-diisocyanate. | 280 parts of fatty acid of ricinene oil. | 120-218 | 3 | 240-250 | 12 |
| 280 parts of fatty acid of linseed oil. | 70 parts of tetramethylene-1,4-diisocyanate. | 120-140 | 1½ | 150-155 | 8 |

NOTE.—The fatty acid of linseed oil is the same as in Examples 1, 2, and 11 (acid number 200; redistilled)

The reaction products obtained in accordance with the foregoing table constitute yellowish to brown resins which are soluble in xylene and, when mixed with known lacquer raw materials, impart thixotropic properties to the lacquer mixture which is obtained.

Example 4

Fatty acid of linseed oil is dissolved in linseed oil-stand oil in approximately the ratio 1:1 and heated for about 3 hours to about 275–300° C. The solution has an acid number of about 116. In a stirrer-type vessel, 241 parts by weight of this solution are mixed in an inert gas atmosphere at about 120 to about 170° C. and over a period of about 1 hour with about 65.5 parts of dicyclohexylmethane-4,4'-diisocyanate. The mixture is stirred for approximately another 5 hours at about 250 to about 260° C. After cooling, there is obtained a light slightly cloudy soft resin with a high degree of thixotropic properties. Some of this soft resin is further treated for about 3 hours at about 300° C. There is obtained a clear light-coloured soft resin with good thixotropic properties.

About 5 parts of this reaction product are stirred with about 95 parts of an alkyd resin with a linseed oil content of about 67% for about 1 hour at about 215° C. After cooling, there is obtained an alkyd resin, the dilute solution of which has pronounced thixotropic properties in white spirit.

Example 5

About 200 parts of the mixture of fatty acid of linseed oil, linseed oil and stand-oil described in Example 4 are reacted with about 46 parts of 1,5-dimethyl-(2,4)-isocyanatomethyl)-benzene. A reaction product is formed which is added in quantities of approximately 2% to an alkyd resin with a linseed oil content of approximately 67% and imparts good thixotropic properties to the said resin.

Example 6

About 200 (parts of a mixture of recinenic acid and ricinene oil with an acid number of about 105 are reacted as described in Example 4 with about 46.5 parts of dicyclohexylmethane-4,4'-diisocyanate. A yellow clear soft resin is formed.

About 20 parts of approximately a 10% solution of this reaction product in white spirit, prepared by simply dissolving it under heat, are added to about 100 parts of approximately a 60% solution of an alkyd resin with a linseed oil content of about 67% in white spirit. With thorough stirring, the mixture is heated to about 100° C. and left at this temperature for about 10 minutes.

The result is a clear thixotropic lacquer mixture which can if desired by provided with driers.

Example 7

About 241 parts of a solution of linseed oil fatty acid in linseed oil-stand oil, as described in Example 4, are reacted in the same way as described therein with a mixture of about 32.3 parts of dicyclohexylmethane-4,4'-diisocyanate and about 21.7 parts of a mixture of toluylene-2,6-diisocyanate and toluylene-2,4-diisocyanate 35:65. An addition of about 5% of the reaction product to an alkyd resin (about 67% linseed oil content) imparts thixotropic properties to the lacquer mixture.

Example 8

About 241 parts of a linseed oil fatty acid linseed oil-stand oil mixture are reacted as described in Example 4 with a mixture of about 32.3 parts of dicyclohexylmethane-4,4'-diisocyanate and about 21.7 parts of a technical mixture of 2,4- and 2,6-toluylene diisocyanate. A light soft resin having thixotropic properties is formed.

If about 10 parts of the reaction product are combined at about 230° C. with about 90 parts of a boiled mixture of linseed oil-stand oil/colophony ester (7:3), a thixotropic clear lacquer is obtained after the conventional drying and dilution.

Example 9

About 101 parts of toluylene-2,6-diisocyanate are reacted as described in Example 1 with about 280 parts by weight of linseed oil fatty acid. There is obtained a brown thixotropic soft resin with an —NCO content of about 1.59%.

Example 10

About 591 parts of stearyl isocyanate are reacted as described in Example 1 with about 592 parts of dimerized linseed oil fatty acid. A brown thixotropic soft resin is formed.

About 20 parts of the reaction product are combined at about 220° C. with an alkyd resin having about 67% linseed oil content, diluted, triturated with 100% titanium white/zinc white (1:1) and driers are added. After dilution to a brushing consistency a white mat lacquer with thixotropic properties is obtained.

Example 11

(a) In a stirrer-type vessel, about 280 parts of linseed oil fatty acid, about 284 parts of octadecen-9,10-diol-1,12 and about 146 parts by weight of adipic acid are esterified within about 10 hours at about 100 to about 200° C. (acid number about 76.3, —OH number 0). About 200 parts of the polyester have added thereto about 35 parts of dicyclohexylmethane-4,4'-diisocyanate at about 135 to about 170° C. within half an hour in an inert gas atmosphere and the mixture is stirred for about 10 hours at about 240 to about 260° C. On cooling, a brown soft resin is formed.

(b) About 200 parts of the polyester as described are reacted in the same way as under (a) with about 23.6 parts of toluylene-2,6-diisocyanate and the result is a brown thixotropic soft resin.

If about 10 g. of the reaction product obtained according to (a) or (b), after being melted, are mixed with about 90 parts of an alkyd resin/stand oil mixture prepared from about 63 parts of an alkyd resin with about 67% linseed oil content and about 27 parts of a linseed oil-stand oil (60 P) being boiled for about 1 hour at about 220° C., is thereafter diluted, triturated with about 65 parts of titanium oxide and provided with driers, there is obtained a thixotropic white lacquer which can be brushed on satisfactorily.

Example 12

About 298 parts of ricinoleic acid and about 296 parts of dimerised linseed oil fatty acid are esterified with addition of about 5.9 parts of about 10% lithium naphthenate solution in xylene within about 6 hours at about 120 to about 210° C. (acid number about 112, OH number about 13). At about 140 to about 240° C., about 84 parts of hexamethylene-1,6-diisocyanate are added within about 2 hours in an inert gas atmosphere and then the mixture is stirred for about 5 hours at about 250° C. A brown soft resin is formed.

About 150 parts of a white lacquer with a base of alkyd resin having about 67% linseed oil content and pigmented with about 70% titanium dioxide (based on binder content) are mixed with about 18 parts of about a 10% solution of the above reaction product in white spirit. The white lacquer contains about 40% alkyd resin, calculated as 100%, the quantity added thus being about 3%, calculated on solid alkyd resin. By heating to about 120° C. and by being kept for about 15 minutes at this temperature, the mixture is homogenised while simultaneously stirring well. Immediately after cooling, the white lacquer has good thixotropic properties.

The dimerized linseed oil fatty acid used throughout the examples is Empol 1022, sold by Emery Ind. Inc.

Example 13

In a stirrer-type vessel, about 134 parts of trimethylol propane, about 606 parts of sebacic acid and about 840 parts of linseed oil fatty acid are esterified within about 8 hours at about 110 to about 200° C. in an inert gas atmosphere (acid number about 192, —OH number 0). About 504 parts of hexamethylene-1,6-diisocyanate are added thereto while stirring and within about 5 hours at about 125 to about 200° C. Stirring is continued for approximately another 3 hours at about 200° C. and a light brown soft resin is formed.

If about 8 parts of the reaction product are boiled with about 92 parts of a linseed oil alkyd resin with an oil content of about 55% for about 1 hour at about 250° C., brought with a mixture of white spirit/xylene (95:5) to a concentration of about 60% solid content and triturated with about 400 parts of red lead (60%), finally adding about 2.8 parts of Co-Pbnaphthenate (1:2 dissolved in xylene), a thixotropic red lead primer is formed.

Example 14

A mixture of about 560 parts linseed oil fatty acid and about 592 parts of dimerised linseed oil fatty acid are reacted in an inert gas atmosphere at about 120 to about 180° C. and while stirring with about 336 parts of hexamethylene-1,6-diisocyanate. Stirring is continued for approximately another 5 hours at about 220 to about 240° C. and a dark brown soft resin is formed (acid number about 4.6).

If about 4 parts of the reaction product are combined with about 96 parts of a mixture of a linseed oil alkyd resin (about 67% oil content) and a maleinate resin (mixing ratio about 85:15) prepared by boiling, the substance being combined at about 220° C., and if the combination is diluted and provided with driers, the result is a thixotropic clear lacquer.

Example 15

In a stirrer-type vessel, about 298 parts of dimerized linseed oil fatty acid are reacted with a mixture of about 62.5 parts of cyclohexylisocyanate and about 42 parts of hexamethylene-1,6-diisocyanate in an inert gas atmosphere within about 2½ hours at about 116 to about 150° C. Stirring is continued for about 8 hours at about 180° C. and a soft brown resin is formed.

If about 10 parts of the reaction product are stirred for about 1 hour at about 250° C. with about 90 parts of an alkyd resin with a linseed oil content of about 67%, and thereafter is diluted with white spirit to a solid content of about 60%, triturated with about 70 parts of titanium oxide and dried, a thixotropic white lacquer is formed.

Example 16

A mixture of about 65.5 parts of dicyclohexylmethane-4,4'-diisocyanate in about 65.5 parts of xylene is mixed within about 1 hour at about 130 to about 140° C. with a solution of about 140 parts of linseed oil fatty acid (acid number 200; redistilled) in 140 parts of xylene in an inert gas atmosphere in a stirrertype vessel. Stirring is continued for about 10 hours while boiling under reflux. On cooling, a yellowish brown paste is formed, the solution of which in xylene is thixotropic.

Although only some of the carboxylic acid organic isocyanate reaction products, lacquer components and the like were employed in the foregoing examples, it is to be understood that any other suitable component or reaction product could have been employed in accordance with the preceding disclosure.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A coating composition which comprises a member selected from the group consisting of a drying and a non-drying oil and from about 0.1% to about 30% by weight of a thixotropic additive prepared by a process which comprises reacting a member selected from the group consisting of a fatty acid and a hydrocarbon polycarboxylic acid with a member selected from the group consisting of an organic monoisocyanate and a symmetrical organic polyisocyanate at least one of said reactants having a carbon to carbon chain of at least 10 carbon atoms.

2. The coating composition of claim 1 wherein said thixotropic additive and said member selected from the group consisting of a drying and a non-drying oil are mixed with an inert organic solvent therefor.

3. A coating composition which comprises a member selected from the group consisting of a drying and a non-drying oil and from about 0.1% to about 30% by weight of a thixotropic additive prepared by a process which comprises reacting linseed oil fatty acid with a member selected from the group consisting of an organic monoisocyanate and a symmetrical organic polyisocyanate in an inert organic solvent therefor.

References Cited by the Examiner

UNITED STATES PATENTS

| | | | |
|---|---|---|---|
| 2,358,475 | 9/44 | Pratt et al. | 260—404.5 |
| 2,609,349 | 9/52 | Cass | 260—18 |
| 2,763,628 | 9/56 | Bruce | 260—18 |
| 2,787,601 | 4/57 | Detrick et al. | 260—18 |
| 2,812,337 | 11/57 | Culemeyer | 260—18 |
| 2,833,730 | 5/58 | Barthel | 260—18 |
| 2,864,780 | 12/58 | Katz | 260—18 |

FOREIGN PATENTS

| | | |
|---|---|---|
| 564,415 | 2/58 | Belgium. |
| 1,049,575 | 1/59 | Germany. |
| 547,672 | 9/42 | Great Britain. |
| 840,830 | 7/60 | Great Britain. |

LEON J. BERCOVITZ, *Primary Examiner.*

A. D. SULLIVAN, MILTON STERMAN, *Examiners.*